US010989284B2

(12) United States Patent
Terada (10) Patent No.: US 10,989,284 B2
(45) Date of Patent: Apr. 27, 2021

(54) STEERING COLUMN DEVICE

(71) Applicant: FUJI KIKO CO., LTD., Shizuoka (JP)

(72) Inventor: Daisuke Terada, Shizuoka (JP)

(73) Assignee: FUJI KIKO CO., LTD., Shizuoka (JP)

( * ) Notice: Subject to any disclaimer, the term of this patent is extended or adjusted under 35 U.S.C. 154(b) by 30 days.

(21) Appl. No.: 16/352,141

(22) Filed: Mar. 13, 2019

(65) Prior Publication Data

US 2019/0301574 A1     Oct. 3, 2019

(30) Foreign Application Priority Data

Mar. 28, 2018 (JP) .............................. JP2018-061071

(51) Int. Cl.
| | |
|---|---|
| *B62D 1/18* | (2006.01) |
| *F16H 25/22* | (2006.01) |
| *B62D 1/181* | (2006.01) |
| *B62D 7/22* | (2006.01) |
| *F16H 25/20* | (2006.01) |

(52) U.S. Cl.
CPC ......... *F16H 25/2209* (2013.01); *B62D 1/181* (2013.01); *B62D 7/224* (2013.01); *F16H 25/20* (2013.01)

(58) Field of Classification Search
CPC ......... B62D 7/224; B62D 1/181; F16H 25/20; F16H 25/2209; F16H 25/2006
USPC .................................................. 74/492, 493
See application file for complete search history.

(56) References Cited

U.S. PATENT DOCUMENTS

| | | | | | |
|---|---|---|---|---|---|
| 4,900,059 | A | * | 2/1990 | Kinoshita ............... | B62D 1/181 280/775 |
| 5,036,720 | A | * | 8/1991 | Shirasawa ............... | B62D 1/181 74/441 |
| 7,226,082 | B2 | * | 6/2007 | Muramatsu ............ | B62D 1/181 280/771 |
| 10,421,476 | B2 | * | 9/2019 | Rouleau ................. | B62D 1/181 |
| 2002/0079685 | A1 | | 6/2002 | Yoshimoto | |
| 2007/0137381 | A1 | * | 6/2007 | Arihara .................. | B62D 1/181 74/493 |

(Continued)

FOREIGN PATENT DOCUMENTS

JP          201225321 A        2/2012

OTHER PUBLICATIONS

European Search Report dated Aug. 21, 2019 corresponding to application No. 19164789.0-1013.

*Primary Examiner* — Toan C To
(74) *Attorney, Agent, or Firm* — Nath, Goldberg & Meyer; Jerald L. Meyer (57) ABSTRACT

A steering column device includes a male screw shaft member supported by an outer column and a female screw member provided in a link member. The female screw member and the male screw shaft member are moved relative to each other by rotation of the male screw shaft member, causing the link member to swing relative to the outer column. The female screw member includes a main body section supported by the link member, a fragile section provided on one side of the main body section, and a screw engaging section provided on the opposite side of the fragile section from the main body section. In a state where an adjust nut is screwed to the screw engaging section, a distal end portion of the adjust nut comes into contact with the main body section and extends the fragile section in the axial direction of the male screw shaft member.

4 Claims, 8 Drawing Sheets

(56) References Cited

U.S. PATENT DOCUMENTS

| | | | |
|---|---|---|---|
| 2009/0100956 A1* | 4/2009 | Warashina | B62D 1/181 74/493 |
| 2009/0199667 A1* | 8/2009 | Menjak | H02K 7/06 74/424.7 |
| 2013/0074640 A1* | 3/2013 | Morinaga | B62D 1/181 74/493 |
| 2013/0098193 A1* | 4/2013 | Morinaga | B62D 1/181 74/493 |
| 2014/0305252 A1* | 10/2014 | Mizuno | B62D 1/187 74/493 |
| 2017/0120944 A1* | 5/2017 | Kato | B62D 1/181 |

* cited by examiner

STEERING COLUMN DEVICE

CROSS REFERENCE TO RELATED APPLICATION

The present application is based on, and claims priority from Japanese Patent Application No. 2018-061071, filed Mar. 28, 2018, the disclosure of which is hereby incorporated by reference herein in its entirety.

TECHNICAL FIELD

The present invention relates to a steering column device that enables adjustment of the position of a steering shaft.

BACKGROUND ART

There is known a steering column device in which a jacket unit rotatably supports a steering shaft, the steering column device including a tilt mechanism configured to swing the jacket unit in the up-down direction (Patent Literature 1: Japanese Patent Application Publication No. 2012-25321). The tilt mechanism rotates a male screw shaft member with an electric motor, causing a female screw member, which is screwed to the male screw shaft member, to move in an axial direction together with a movable side casing. Consequently, the jacket unit swings in the up-down direction.

SUMMARY

A gap (a backlash) for sliding is necessary in a screwing portion of the male screw shaft member and the female screw member. The gap causes rattling of the steering shaft. Therefore, the conventional steering column device described above is provided with two nuts screwed to the male screw shaft member, a wedge member configured to press the two nuts in the axial direction of the male screw shaft member, and a screw member and a double nut for preventing the wedge member from coming off the movable side casing, in order to suppress the rattling. Therefore, in the conventional steering column device, the number of components is large, structure is complicated, and manufacturing cost tends to be high.

Therefore, an object of the present invention is to suppress, with a simple configuration, rattling of the screwing portion of the male screw shaft member and the female screw member.

The present invention provides a steering column device including: a male screw shaft member rotatably provided in one of a support section and a movable section, a male screw being formed along an axial direction in the male screw shaft member; and a female screw member provided in another of the support section and the movable section, the male screw shaft member being screwed to the female screw member, the female screw member and the male screw shaft member being configured to be moved relative to each other by rotation of the male screw shaft member, the movable section being configured to move relative to the support section. The female screw member includes: a main body section provided in the other of the support section and the movable section; a fragile section provided on one side of the main body section in the axial direction of the male screw shaft member; and a screw engaging section provided on an opposite side of the fragile section from the main body section. An adjust member screwed to the screw engaging section is provided. In a state where the adjust member is screwed to the screw engaging section, a distal end portion of the adjust member presses the main body section and extends the fragile section in the axial direction of the male screw shaft member.

According to the present invention, in the female screw member, since the fragile section extends in the axial direction of the male screw shaft member, screw threads formed on the inner surface of the female screw member are also pulled in the axial direction and a pitch among the screw threads expands. Consequently, side surfaces of the screw threads of the female screw member are pressed against side surfaces of screw threads of the male screw shaft member. Rattling of a screwing portion of the male screw shaft member and the female screw member can be suppressed. When rattling is suppressed, the fragile section and the screw engaging section are integrally formed in the main body section of the female screw member. An additional component is only the adjust member. Therefore, the steering column device has a simple configuration in which an increase in the number of components is suppressed.

DESCRIPTION OF EMBODIMENTS

An embodiment of the present invention is explained below with reference to the drawings.

Figure 1:
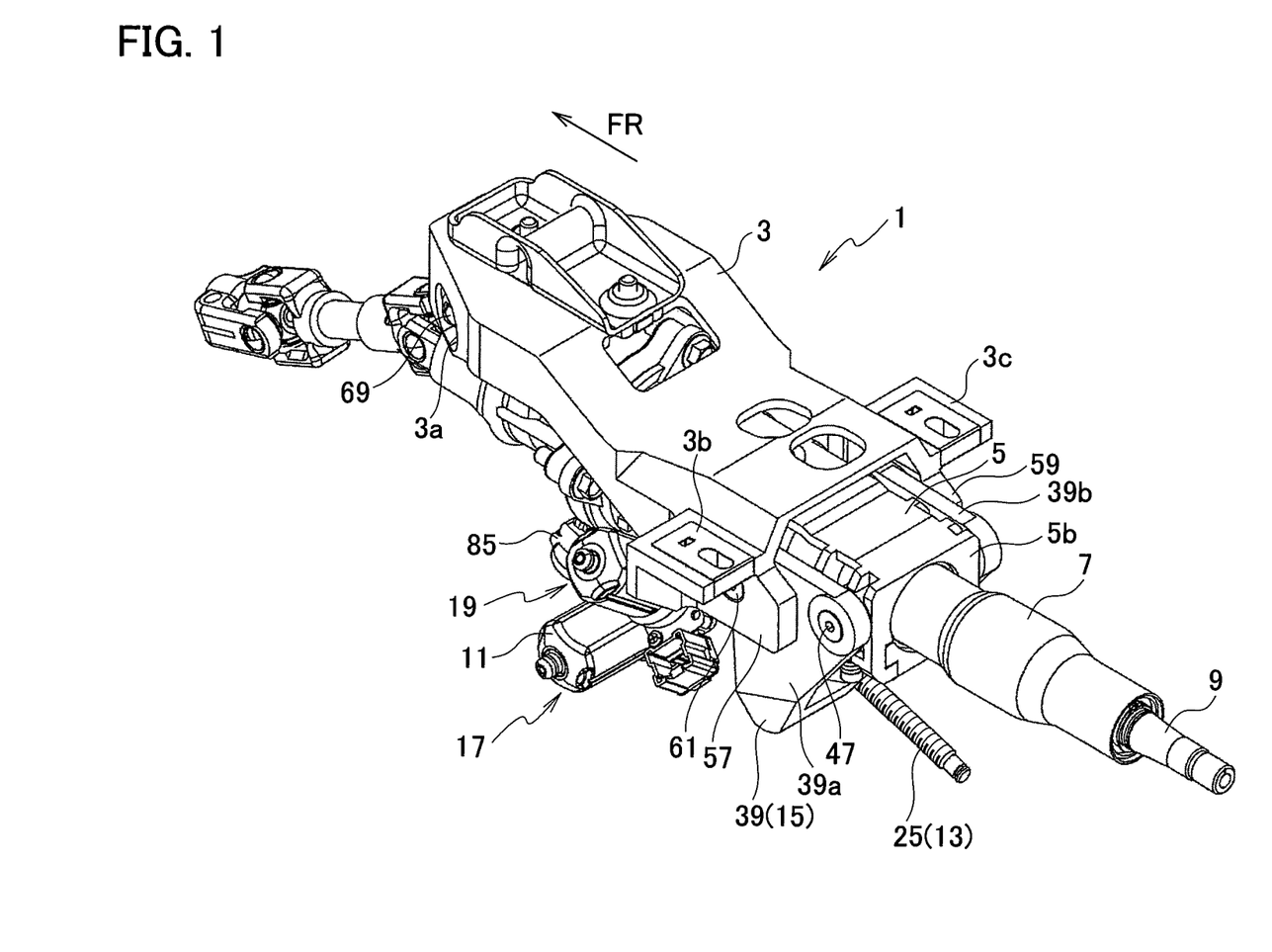
FIG. 1 is a perspective view showing a steering column device according to an embodiment of the present invention.
Figure 2:
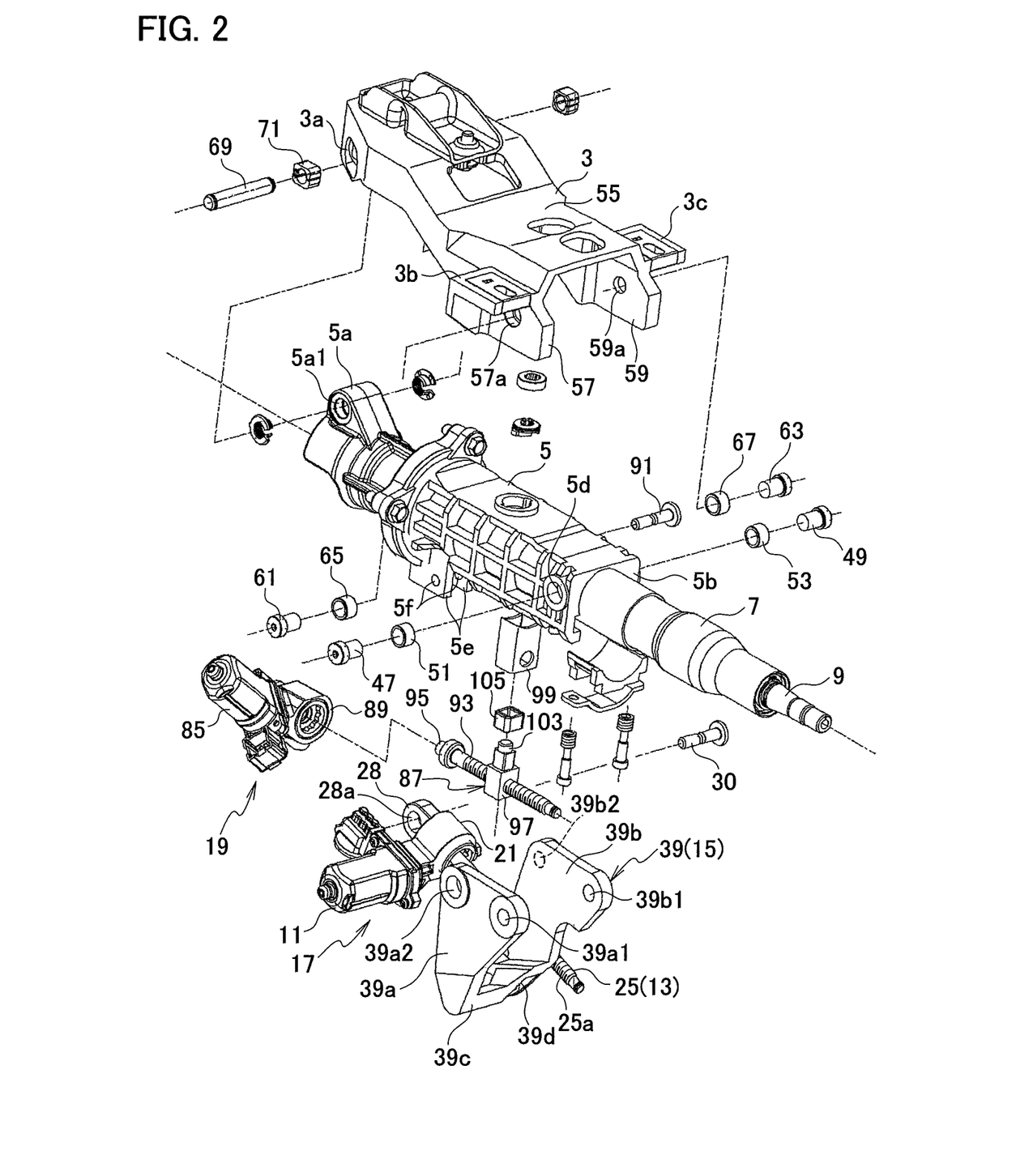
FIG. 2 is an exploded perspective view of the steering column device shown in FIG. 1.
Figure 3:
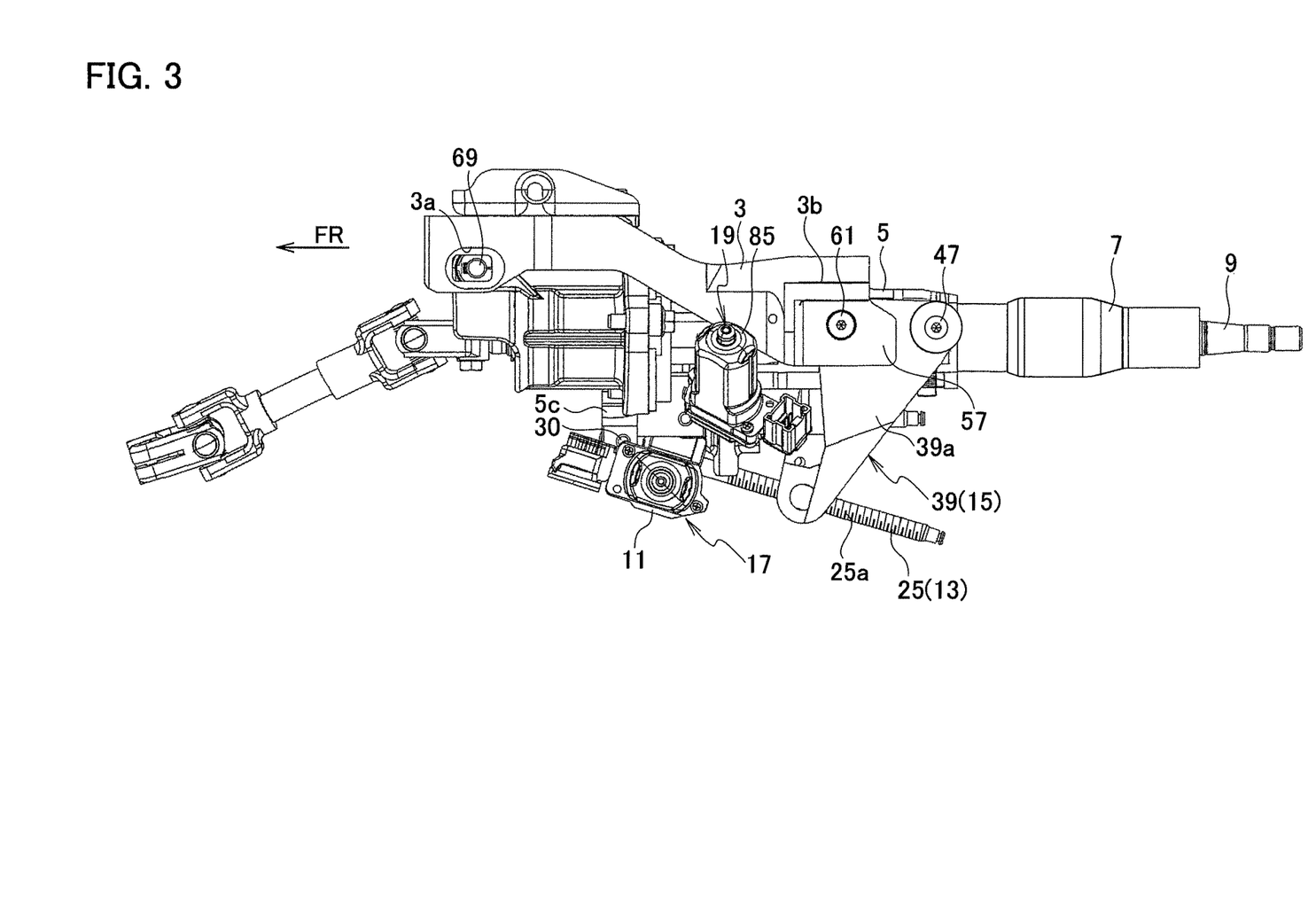
FIG. 3 is a left side view of the steering column device shown in FIG. 1.

FIGS. 1 to 3 show a steering column device 1 according to the embodiment of the present invention. A direction indicated by an arrow FR in FIG. 1 in a state where the steering column device 1 is attached to a vehicle body is a vehicle body forward direction. In the following explanation, "forward direction" indicates the vehicle body forward direction, "rearward direction" indicates a vehicle body rearward direction, and "left-right direction" indicates a left-right direction in a state where the forward direction is viewed from the vehicle body rearward direction.

The steering column device 1 includes a vehicle body attachment bracket 3 attached to a not-shown vehicle body, an outer column 5 supported swingably in the up-down direction with respect to the vehicle body attachment bracket 3 via a swing support section 5a in a front end upper part, and an inner column 7 movable in the vehicle body front-rear direction with respect to the outer column 5.

The vehicle body attachment bracket 3 includes attachment sections 3b, 3c, and the like in a plurality of parts and is attached to the vehicle body via the attachment sections 3b, 3c, and the like. The inner column 7 projects rearward from a rear end 5b of the outer column 5 and rotatably holds a steering shaft 9 on the inside. A not-shown steering wheel is attached to an end portion on a rear side of the steering shaft 9.

The outer column 5 swings in the up-down direction with respect to the vehicle body attachment bracket 3 via a motor 11 for tilt driving and a ball screw mechanism 13 and a link mechanism 15 operated by the motor 11. When the outer column 5 swings in the up-down direction, the inner column 7 and the steering shaft 9 also integrally swing.

Therefore, the steering column device 1 includes an electric tilt mechanism 17 configured to allow the steering wheel (the steering shaft 9) to swing in the up-down direction. The steering column device 1 further includes an electric telescopic mechanism 19 configured to allow the steering wheel (the steering shaft 9) to move in the front-rear direction together with the inner column 7 with respect to the outer column 5.

The electric tilt mechanism 17 is explained in detail.

In the motor 11 for tilt driving, a speed reducer unit 21 shown in FIG. 2 is integrally provided. A worm 23 (see FIG. 4) of the speed reducer unit 21 is in mesh with a worm wheel 26. The worm wheel 26 is attached to the outer circumference of the end portion on the front side of a male screw shaft member 25. In the male screw shaft member 25, a male screw 25a is formed in the outer circumferential portion further on the rear side than the worm wheel 26. Therefore, the male screw shaft member 25 is rotated via the worm 23 and the worm wheel 26 by rotation driving of the motor 11 for tilt driving.

As shown in FIG. 2, an attachment section 28 projecting forward is formed in the speed reducer unit 21. An attachment hole 28a piercing through the attachment section 28 in the left-right direction is formed in the attachment section 28. On the other hand, as shown in FIG. 3, a motor support section 5c is formed in a lower part of the outer column 5. A motor supporting pin 30 is inserted into an attachment hole of the motor support section 5c and the attachment hole 28a of the attachment section 28, whereby the speed reducer unit 21 and the motor 11 for tilt driving are attached to the outer column 5 turnably with the left-right direction as an axis. In this case, the male screw shaft member 25 is rotatable with respect to the outer column 5 functioning as a support section.

Figure 4:
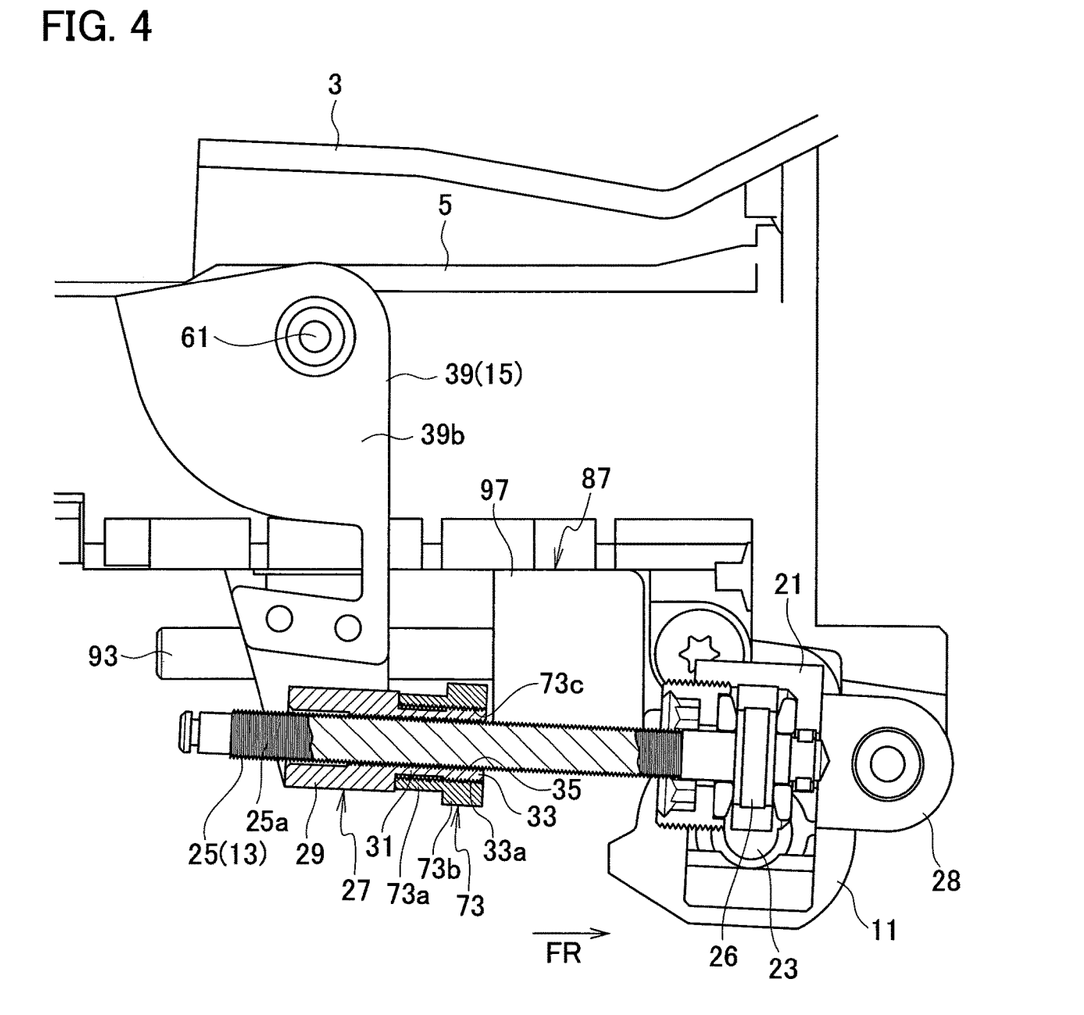
FIG. 4 is a sectional view around a male screw shaft member taken along an axial direction.
Figure 5:
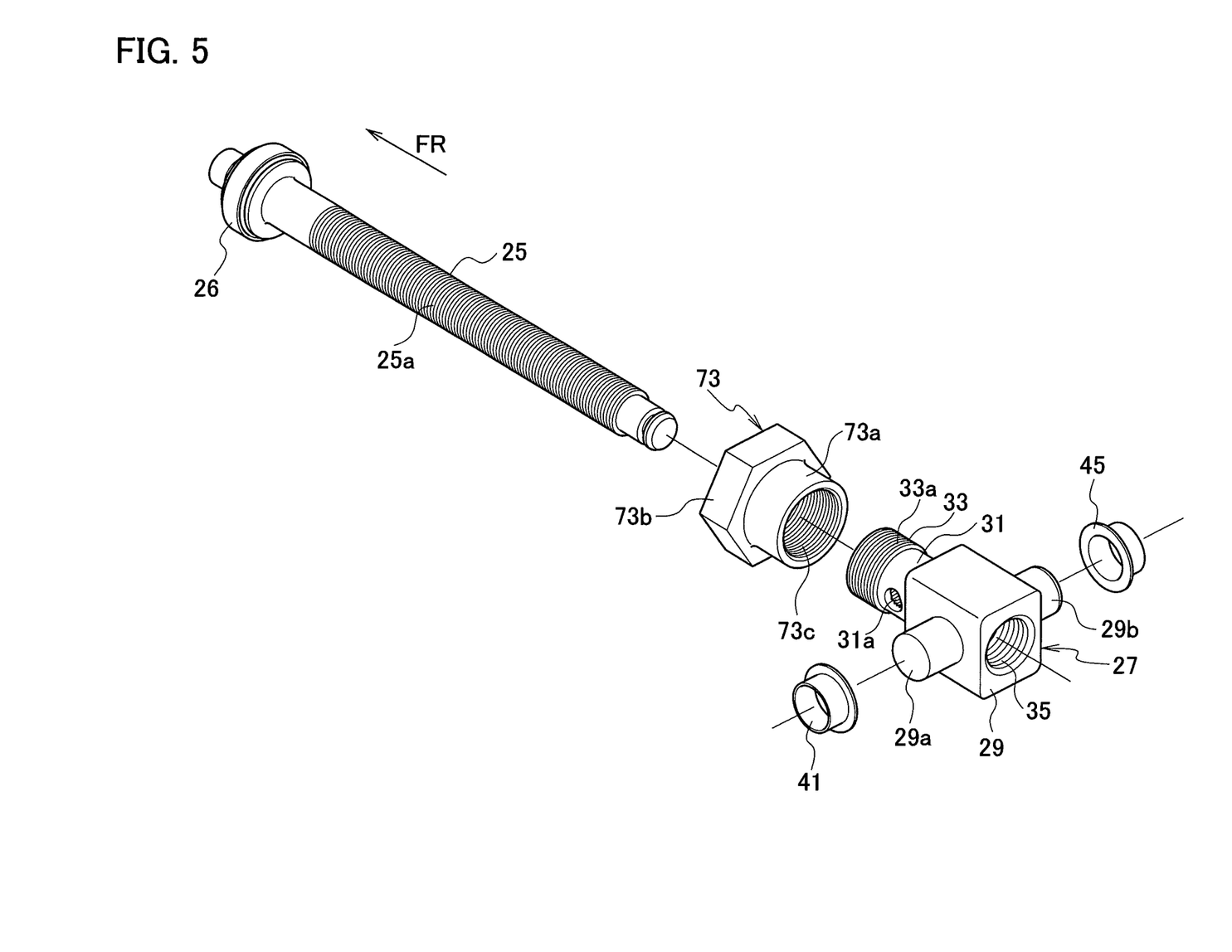
FIG. 5 is an exploded perspective view of the male screw shaft member, a female screw member, and an adjust nut.

A female screw member 27 shown in FIGS. 4 and 5 is screwed to the male screw shaft member 25. The female screw member 27 includes a main body section 29 having a rectangular parallelepiped shape long in the front-rear direction, a fragile section 31 having a cylindrical shape provided on the front side of the main body section 29, and a screw engaging section 33 having a cylindrical shape located on the opposite side of the fragile section 31 from the main body section 29. The main body section 29, the fragile section 31, and the screw engaging section 33 are formed integrally with one another. A female screw 35 is continuously formed in the axial direction on the insides of the main body section 29, the fragile section 31, and the screw engaging section 33. The fragile section 31 and the screw engaging section 33 are explained below.

Figure 6:
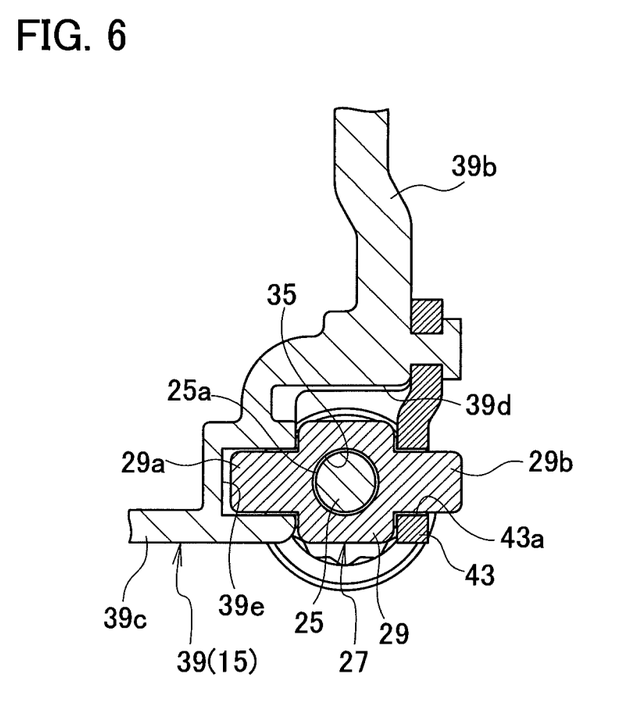
FIG. 6 is a front sectional view showing a state where a main body section of the female screw member is attached to a right side lower part of a link member.

In the main body section 29, supporting shaft sections 29a and 29b projecting toward left and right both side directions are formed on left and right both side surfaces. As shown in FIG. 6, the main body section 29 is supported by a link member 39, which functions as a movable section of the link mechanism 15, via the supporting shaft sections 29a and 29b. The link member 39 includes, as shown in FIG. 2, side plate sections 39a and 39b opposed to each other in the left-right direction and a bottom plate section 39c that connects lower parts of the side plate sections 39a and 39b. The link member 39 is formed in a substantial U shape in a front view.

In the link member 39, a recessed section 39d recessed to the inner side is formed in a corner portion of a boundary portion between the side plate section 39b on the right side and the bottom plate section 39c. A supporting hole 39e opening to the right side is formed in a sidewall of the recessed section 39d. The supporting shaft section 29a is rotatably supported by the supporting hole 39e via a bearing 41. An end plate 43 is attached to the right-side opening of the recessed section 39d. A supporting hole 43a piercing through the end plate 43 in the left right direction is formed in the end plate 43. The supporting shaft section 29b is rotatably supported by the supporting hole 43a via a bearing 45. The bearings 41 and 45 are omitted in FIG. 6.

As shown in FIGS. 2 and 3, in the link member 39, the side plate sections 39a and 39b are formed in a substantially inverted triangular shape in a side view. Rear through-holes 39a1 and 39b1 piercing through the side plate sections 39a and 39b in the left-right direction are formed at the rear end corners portions in upper parts of the side plate sections 39a and 39b. On the other hand, link supporting holes 5d are respectively formed in left and right both side sections near the rear end portion of the outer column 5. The outer column 5 is disposed between the side plate sections 39a and 39b. A pair of left and right link supporting pins 47 and 49 are inserted through the rear through-holes 39a1 and 39b1 and the left and right link supporting holes 5d. Bearing 51 and 53 are respectively provided in the outer circumferential portions of the link supporting pins 47 and 49.

The vehicle body attachment bracket 3 includes an upper wall section 55 and left and right sidewall sections 57 and 59 extending downward from left and right both side edges of the upper wall section 55. Link swing center holes 57a and 59a are formed in lower parts of the attachment sections 3b and 3c near rear side end portions of the left and right sidewall sections 57 and 59. On the other hand, supporting holes 39a2 and 39b2 aligned with the link swing center holes 57a and 59a are formed at front end corner portions of the side plate sections 39a and 39b.

As shown in FIG. 1, rear end portions of the left and right sidewall sections 57 and 59 of the vehicle body attachment bracket 3 are located on the left and right direction outer sides of a front end corner portion in an upper part of the link member 39. Namely, the left and right sidewall sections 57 and 59 cover the side plate sections 39a and 39b from the left and right both sides. In this state, a pair of left and right link swing supporting pins 61 and 63 are inserted into the link swing center holes 57a and 59a and the supporting holes 39a2 and 39b2. Bearings 65 and 67 are respectively provided in the outer circumferential portions of the link swing supporting pins 61 and 63.

A column supporting hole 3a piercing through the left and right sidewall sections 57 and 59 of the vehicle body attachment bracket 3 in the left-right direction is formed near the front end portions of the left and right sidewall sections 57 and 59. On the other hand, a through-hole 5a1 piercing through the swing support section 5a of the outer column 5 in the left-right direction is formed in the swing support section 5a. In a state where the swing support section 5a is disposed between the left and right sidewall sections 57 and 59, a swing supporting pin 69 is inserted into the column supporting hole 3a and the through-hole 5a1 via a sleeve 71. Consequently, the outer column 5 swings in the up-down direction centering on the swing supporting pin 69 with respect to the vehicle body attachment bracket 3.

In the electric tilt mechanism 17 having the configuration explained above, the male screw shaft member 25 is rotated by the driving of the motor 11 for tilt driving. The female screw member 27 moves along the male screw shaft member 25. The link member 39 swings back and forth centering on the link swing supporting pins 61 and 63 according to the movement of the female screw member 27. The outer column 5 swings up and down according to the back and forth swinging of the link member 39. The position in the up-down direction of the steering shaft 9 is adjusted. The column supporting hole 3a is a long hole elongated along the front-rear direction. The sleeve 71 is movable in the front-rear direction in the column supporting hole 3a. Consequently, a track difference between a rotation center (the swing supporting pin 69) in the up-down swinging of the outer column 5 and a link rotation center (the link swing supporting pins 61 and 63) is absorbed.

The fragile section 31 and the screw engaging section 33 of the female screw member 27 shown in FIG. 5 is explained.

The fragile section 31 is located on the front side of the main body section 29. The screw engaging section 33 is located further on the front side of the fragile section 31. In the main body section 29, a portion excluding the supporting shaft sections 29a and 29b has a vertically long rectangular shape in a front view as shown in FIG. 6. The outer diameter of the fragile section 31 is smaller than the respective longitudinal and lateral lengths of the rectangular shape in a front view of the main body section 29. Therefore, concerning a dimension in a direction orthogonal to the axial direction of the male screw shaft member 25, the fragile section 31 is smaller than the main body section 29 excluding the supporting shaft sections 29a and 29b. Further, concerning a sectional area in the direction orthogonal to the axial direction of the male screw shaft member 25, the fragile section 31 is smaller than the main body section 29 excluding the supporting shaft sections 29a and 29b.

In the fragile section 31, at least one circular cut-off hole 31a is formed as a cut-off section. The cut-off hole 31a may pierce through the fragile section 31 or may be formed as a recessed section without piercing through the fragile section 31. The cut-off hole 31a may not be circular or may have, for example, a long hole shape.

The outer diameter of the screw engaging section 33 having the cylindrical shape is slightly larger than the fragile section 31 having the cylindrical shape. A male screw section 33a is formed in the outer circumferential portion of the screw engaging section 33. An adjust nut 73 functioning as an adjust member is screwed to the male screw section 33a. The adjust nut 73 includes a cylindrical section 73a and a hexagonal section 73b. A female screw section 73c is formed on the inner surface of the adjust nut 73. When the female screw section 73c is screwed to the male screw section 33a of the screw engaging section 33, the cylindrical section 73a is placed on the rear side (the front side in a screwing direction) with respect to the hexagonal section 73b.

Figure 7:
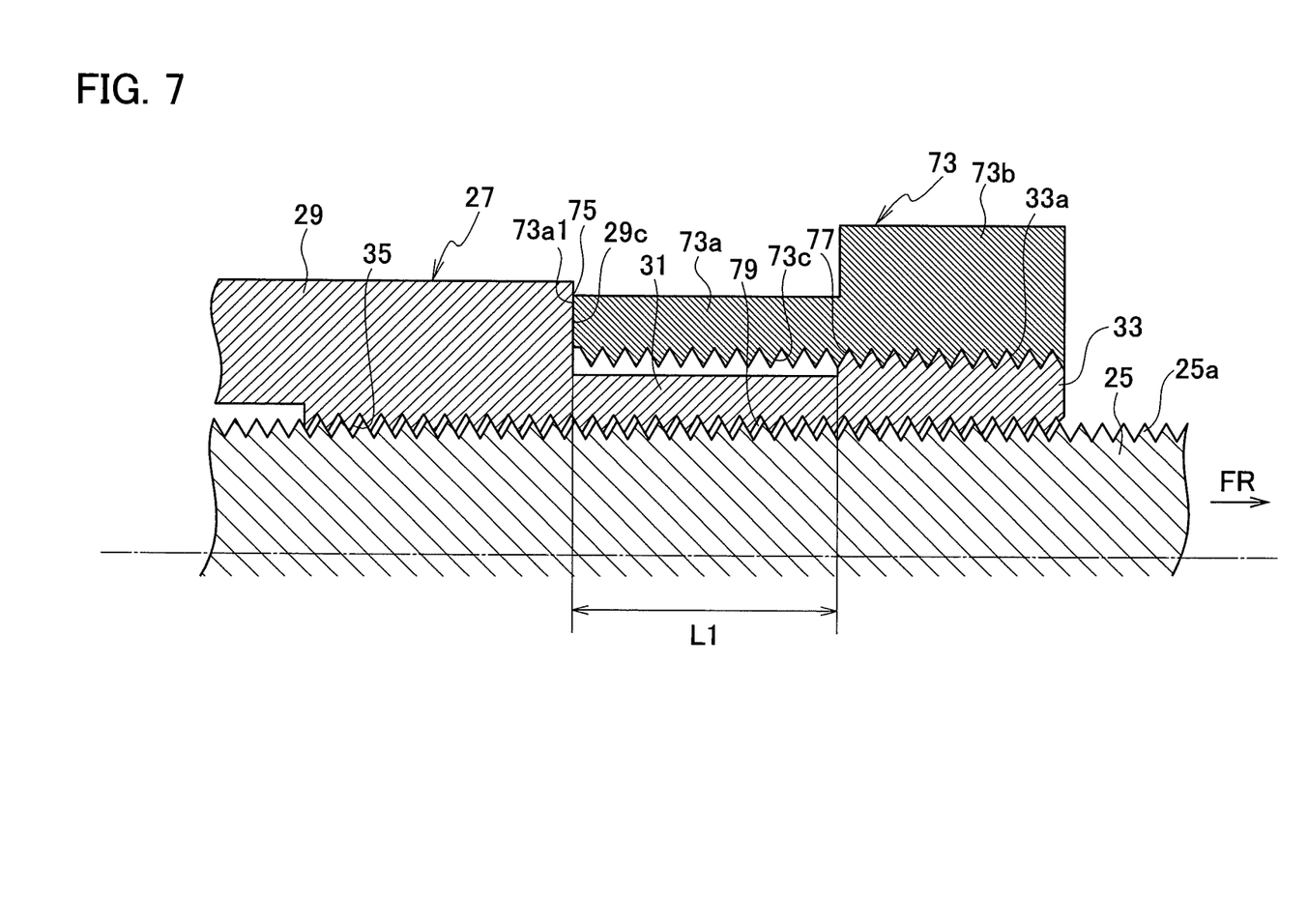
FIG. 7 is a sectional view showing a state where rattling occurs between the male screw shaft member and the female screw member.

When the adjust nut 73 is screwed to the screw engaging section 33, as shown in FIG. 7, in a contact section 75, a distal end portion 73a1 of the cylindrical section 73a comes into contact with an end face 29c on the fragile section 31 side of the main body section 29. After the contact, when the adjust nut 73 is further screwed to the screw engaging section 33, the distal end portion 73a1 presses the end face 29c. Consequently, the fragile section 31 extends in the axial direction (the left-right direction in FIG. 7) between the contact section 75 and a screw fastener 77 (an interval L1 shown in FIG. 7). The screw fastener 77 is a portion where the female screw section 73c of the adjust nut 73 and the male screw section 33a of the screw engaging section 33 are screwed.

Figure 8:
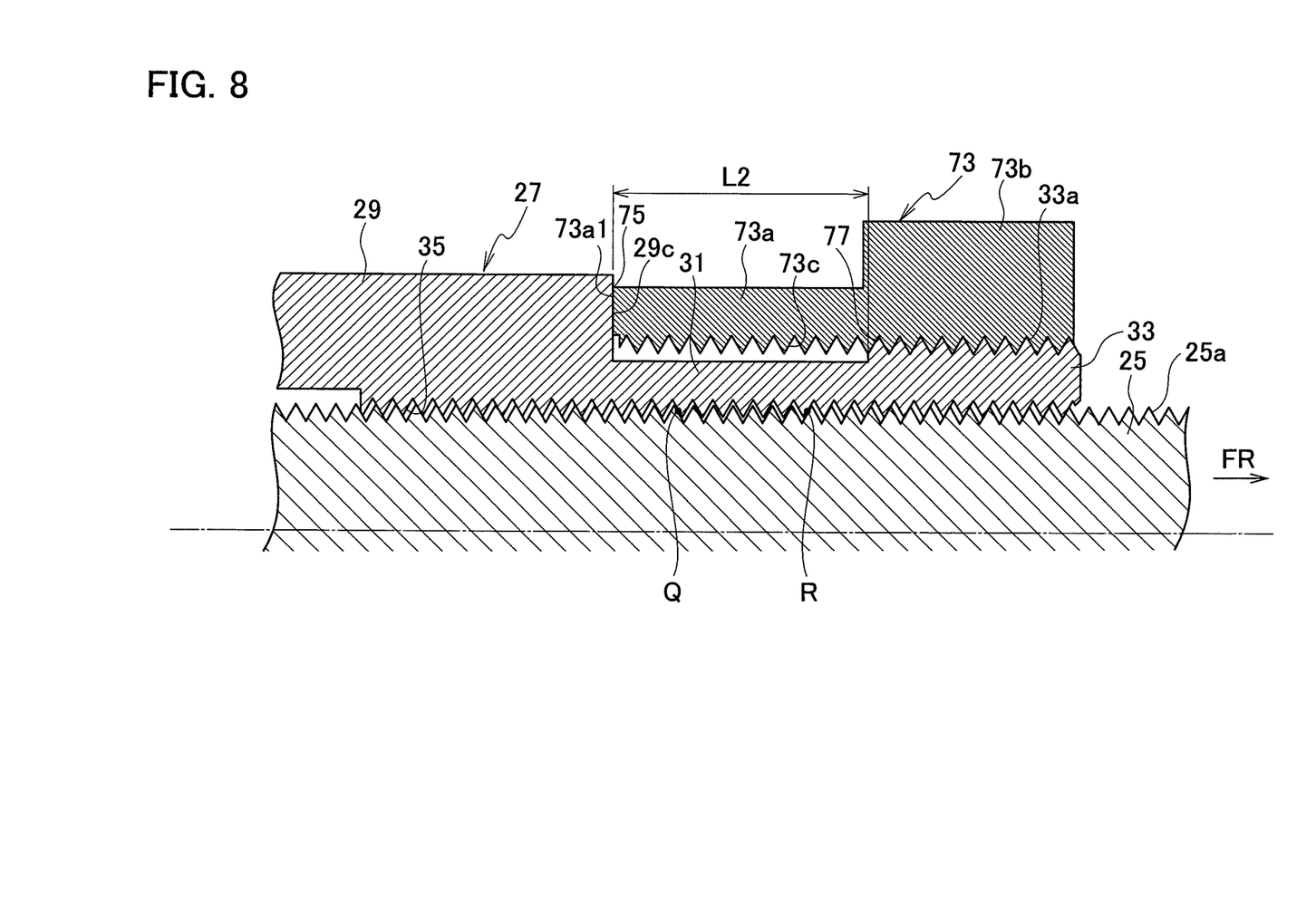
FIG. 8 is a sectional view showing a state where rattling between the male screw shaft member and the female screw member is suppressed.

FIG. 8 shows a state where the fragile section 31 extends in the axial direction (the left-right direction in FIGS. 7 and 8) with respect to FIG. 7. An interval between the contact section 75 and the screw fastener 77 is indicated by L2 (L1<L2). When the fragile section 31 extends in the axial direction as shown in FIG. 8, the female screw 35 formed on the inner surface of the fragile section 31 also extends in the axial direction. When the female screw 35 extends in the axial direction, screw threads of the female screw 35 are pulled in the axial direction. An interval (a pitch) among a plurality of screw threads formed along the axial direction expands.

In a state before the fragile section 31 extends in the axial direction as shown in FIG. 7, the male screw 25a of the male screw shaft member 25 and the female screw 35 of the female screw member 27 are in a normal screw fastening state. A gap 79 is formed over the entire length of the screw fastener including the interval L1 and rattling occurs.

On the other hand, in a state where the fragile section 31 extends in the axial direction as shown in FIG. 8, as explained above, the female screw 35 also extends in the axial direction according to the extension of the fragile section 31. The interval (the pitch) among the plurality of screw threads in the female screw 35 expands. Consequently, as shown in FIG. 8, for example, in a contact section Q, left side surfaces of threads of the female screw 35 come into contact with and press right side surfaces of threads of the male screw 25a. In a contact section R, right side surfaces of the threads of the female screw 35 come into contact with and press left side surfaces of the threads of the male screw 25a. As a result, relative movement in the axial direction of the male screw shaft member 25 and the female screw member 27 is restricted. Rattling of the screw fastener 77 between the male screw 25a and the female screw 35 is suppressed.

The electric telescopic mechanism 19 is explained.

In the electric telescopic mechanism 19 shown in FIGS. 1 to 3, the inner column 7 moves in the front-rear direction with respect to the outer column 5 together with the steering shaft 9 via a motor 85 for telescopic driving, a ball screw mechanism 87 operated by the motor 85 and the like. A speed reducer unit 89 is integrated and provided in the motor 85 for telescopic driving. The motor 85 for telescopic driving and the speed reducer unit 89 are turnably supported, via a supporting pin 91, by an attachment support section 5e formed in a lower part of the outer column 5 shown in FIG. 2. An attachment supporting hole 5f piercing thorough the attachment support section 5e in the left-right direction is formed in the attachment support section 5e. The supporting pin 91 is inserted into the attachment supporting hole 5f and a supporting hole on the motor 85 for telescopic driving side.

A not-shown worm of the speed reducer unit 89 meshes with a worm wheel 95 attached to the end portion outer circumference on the front side of a telescopic male screw shaft member 93. Therefore, the telescopic male screw shaft member 93 is rotated via the worm and the worm wheel 95 by rotation driving of the motor 85 for telescopic driving. A telescopic female screw member 97 having a rectangular parallelepiped shape is screwed to the telescopic male screw shaft member 93.

A through-hole (not shown in the figures) piercing through the inner column 7 and communicating with the inside of a tubular member 99 is formed in a lower part of the inner column 7. The tubular member 99 is fixed to a lower outer circumferential surface of the inner column 7. A stopper protrusion 103 projecting into the inner column 7 through the through-hole is formed in the stereoscopic female screw member 97. A bush 105 is disposed between the tubular member 99 and the stopper protrusion 103 of the telescopic female screw member 97.

In the electric telescopic mechanism 19 having the configuration explained above, the telescopic male screw shaft member 93 is rotated by the driving of the motor 85 for telescopic driving. The telescopic female screw member 97 moves in the front-rear direction along the telescopic male screw shaft member 93. The inner column 7 moves in the front-rear direction with respect to the outer column 5 according to the movement in the front-rear direction of the telescopic female screw member 97. A front-rear direction position of the steering shaft 9 is adjusted.

In the electric telescopic mechanism 19 explained above, as in the electric tilt mechanism 17, a fragile section and a screw engaging section are integrated with the telescopic female screw member 97 and an adjust nut screwed to the screw engaging section is provided. Consequently, it is possible to suppress rattling of a screw coupler between the telescopic male screw shaft member 93 and the telescopic female screw member 97.

Operational effects of the embodiment explained above are explained.

The steering column device 1 in this embodiment includes the male screw shaft member 25 rotatably provided in the outer column 5, the male screw 25a being formed along the axial direction of the male screw shaft member 25; and the female screw member 27 provided in the link member 39, the male screw shaft member 25 being screwed to the female screw member 27. The female screw member 27 and the male screw shaft member 25 is moved relative to each other by rotation of the male screw shaft member 25, causing the link member 39 to swing relative to the outer column 5. The female screw member 27 includes the main body section 29 provided in the link member 39, the fragile section 31 provided on one side of the main body section 29 in the axial direction of the male screw shaft member 25, and the screw engaging section 33 provided on the opposite side of the fragile section 31 from the main body section 29. The adjust nut 73 screwed to the screw engaging section 33 is provided. In a state where the adjust nut 73 is screwed to the screw engaging section 33, the distal end portion 73a1 of the adjust nut 73 presses the main body section 29 and extends the fragile section 31 in the axial direction of the male screw shaft member 25.

The fragile section 31 extends in the axial direction of the male screw shaft member 25, whereby the interval (the pitch) among the threads of the female screw 25 in the fragile section 31 expands. When the interval among the threads of the female screw 35 expands, as explained above, in the contact sections Q and R shown in FIG. 8, the threads of the female screw 35 and the threads of the male screw 25a come into contact. Consequently, it is possible to suppress rattling of the screw fastener between the male screw shaft member 25 and the female screw member 27.

When rattling is suppressed, the fragile section 31 and the screw engaging section 33 are integrally formed in the main body section 29 of the female screw member 27. An additional component is only the adjust nut 73. Therefore, it is possible to suppress rattling of the screwing portion of the male screw shaft member 25 and the female screw member 27 with a simple configuration in which an increase in the number of components is suppressed.

In the fragile section 31 in this embodiment, a sectional area in the direction orthogonal to the axial direction of the male screw shaft member 25 is smaller than the sectional area of the main body section 29. Therefore, the fragile section 31 has rigidity lower than the rigidity of the main body section 29 and easily extends when being pulled in the axial direction. It is possible to more surely suppress rattling of the screwing portion of the male screw shaft member 25 and the female screw member 27.

In the fragile section 31 in this embodiment, a dimension in the direction orthogonal to the axial direction of the male screw shaft member 25 is smaller than the dimension of the main body section 29. Therefore, the fragile section 31 has rigidity lower than the rigidity of the main body section 29 and easily extends when being pulled. It is possible to more surely suppress rattling of the screwing portion of the male screw shaft member 25 and the female screw member 27.

The fragile section 31 in this embodiment includes the cut-off hole 31a. Consequently, the fragile section 31 has lower rigidity and easily extends when being pulled. It is possible to more surely suppress rattling of the screwing portion of the male screw shaft member 25 and the female screw member 27.

The embodiment of the present invention is explained above. However, the embodiment is only an illustration described to facilitate understanding of the present invention. The present invention is not limited to the embodiment. The technical scope of the present invention is not limited to the specific technical matters disclosed in the embodiment and includes various modifications, changes, alternative techniques, and the like that can be easily derived from the specific technical matters.

For example, the motor for tilt driving 11 and the speed reducer unit 21 may be provided in the link member 39. The female screw member 27 may be provided in the outer column 5. Namely, the male screw shaft member 25 is rotatably provided in one of the outer column 5 and the link member 39. The female screw member 27 is provided in the other of the outer column 5 and the link member 39.

The electric tilt mechanism 17 may directly swing the outer column 5 up and down with respect to the vehicle body attachment bracket 3 according to the relative movement of the male screw shaft member 25 and the female screw member 27 without using the link member 39.

What is claimed is:

1. A steering column device comprising:
   a male screw shaft member rotatably provided in one of a support section and a movable section, a male screw being formed along an axial direction in the male screw shaft member; and
   a female screw member provided in another of the support section and the movable section, the male screw shaft member being screwed to the female screw member,
   the female screw member and the male screw shaft member being configured to be moved relative to each other by rotation of the male screw shaft member, the movable section being configured to move relative to the support section,
   wherein the female screw member includes:
   a main body section provided in the other of the support section and the movable section;
   a fragile section provided on one side of the main body section in the axial direction of the male screw shaft member; and a screw engaging section provided on an opposite side of the fragile section from the main body section, wherein an adjust member screwed to the screw engaging section is provided, wherein rigidity of the fragile section in the axial direction of the male screw shaft member is lower than rigidity of the main body section in the axial direction of the male screw shaft member so that the fragile section is extendable in the axial direction of the male screw shaft member when being pulled in the axial direction of the male screw shaft member, and and wherein, in a state where the adjust member is screwed to the screw engaging section, a distal end portion of the adjust member presses the main body section and extends the fragile section in the axial direction of the male screw shaft member.

2. The steering column device according to claim 1, wherein, in the fragile section, a sectional area in a direction orthogonal to the axial direction of the male screw shaft member is smaller than the sectional area of the main body section.

3. The steering column device according to claim 1, wherein, in the fragile section, a dimension in a direction orthogonal to the axial direction of the male screw shaft member is smaller than the dimension of the main body section.

4. The steering column device according to claim 1, wherein the fragile section includes a cut-off section.

* * * * *